US009940930B1

(12) United States Patent
Campbell et al.

(10) Patent No.: US 9,940,930 B1
(45) Date of Patent: Apr. 10, 2018

(54) SECURING AUDIO DATA

(71) Applicant: Google LLC, Mountain View, CA (US)

(72) Inventors: Lee Campbell, Mountain View, CA (US); Samuel Kramer Beder, San Francisco, CA (US)

(73) Assignee: Google LLC ( * ) Notice: Subject to any disclaimer, the term of this patent is extended or adjusted under 35 U.S.C. 154(b) by 0 days.

(21) Appl. No.: 15/372,182

(22) Filed: Dec. 7, 2016

(51) Int. Cl.
G10L 21/00 (2013.01)
G10L 15/22 (2006.01)
G10L 17/22 (2013.01)
G10L 15/08 (2006.01)

(52) U.S. Cl.
CPC .............. G10L 15/22 (2013.01); G10L 17/22 (2013.01); G10L 2015/088 (2013.01)

(58) Field of Classification Search
CPC ................................ G10L 17/22; G10L 15/22
USPC .......................................................... 704/273
See application file for complete search history.

(56) References Cited

U.S. PATENT DOCUMENTS

| 5,267,312 | A  | 11/1993 | Thompson et al. |
| 6,480,825 | B1 | 11/2002 | Sharma et al. |
| 6,496,581 | B1 | 12/2002 | Finn et al. |
| 6,507,653 | B1 | 1/2003  | Romesburg |
| 6,741,874 | B1 | 5/2004  | Novorita et al. |
| 6,889,321 | B1 | 5/2005  | Kung et al. |
| 6,904,146 | B2 | 6/2005  | Domer et al. |
| 6,928,161 | B1 | 8/2005  | Graumann |
| 7,072,354 | B1* | 7/2006 | Beathard ................. H04L 63/10 370/447 |
| 7,158,776 | B1 | 1/2007  | Estes et al. |
| 7,228,429 | B2 | 6/2007  | Monroe |
| 7,447,321 | B2 | 11/2008 | Furge et al. |

(Continued)

FOREIGN PATENT DOCUMENTS

| CN | 105933893    | 3/2016  |
| WO | WO2013025590 | 2/2013  |
| WO | WO2014186090 | 11/2014 |

OTHER PUBLICATIONS www.Sensory.com [online]. "Fortemedia Announces a Low Power, Key Word Spotting Voice Trigger and Control IC," Dec. 10, 2014 [retrieved on Dec. 7, 2016] Retrieved from the Internet: URL< http://www.sensory.com/fortemedia-announces-low-power-key-word-spotting-voice-trigger-control-ic/.

(Continued)

Primary Examiner — Shaun Roberts
(74) Attorney, Agent, or Firm — Fish & Richardson P.C.

(57) ABSTRACT

Methods, systems, and apparatus, including computer programs encoded on a computer storage medium, for securing audio data. In one aspect, a method includes restricting access by the device to audio information detected by a microphone, receiving data indicating that the device is authorized to access audio information detected by the microphone during a limited period of time, and in response to receiving data indicating that the device is authorized to access audio information detected by the microphone during the limited period of time, providing audio information to the device. The method also includes monitoring audio information detected by the microphone during the limited period of time for the presence of a hotword and after the end of the limited period of time, restricting access by the device to audio information detected by the microphone.

20 Claims, 4 Drawing Sheets

(56) References Cited

U.S. PATENT DOCUMENTS

| | | | |
|---|---|---|---|
| 7,602,925 B2 | 10/2009 | Kreifeldt et al. | |
| 8,099,289 B2 | 1/2012 | Mozer et al. | |
| 8,452,597 B2 | 5/2013 | Bringert et al. | |
| 8,719,039 B1 | 5/2014 | Sharifi | |
| 8,996,381 B2 | 3/2015 | Mozer et al. | |
| 9,059,971 B2 * | 6/2015 | Graham | H04L 63/0428 |
| 2008/0312934 A1 | 12/2008 | Cerra et al. | |
| 2009/0043580 A1 | 2/2009 | Mozer et al. | |
| 2009/0049307 A1 * | 2/2009 | Lin | G06F 21/72 |
| | | | 713/185 |
| 2010/0114573 A1 * | 5/2010 | Huang | G10L 17/24 |
| | | | 704/250 |
| 2010/0246788 A1 | 9/2010 | Menard et al. | |
| 2011/0311045 A1 | 12/2011 | Candelore et al. | |
| 2013/0047266 A1 | 2/2013 | Radhakrishnan et al. | |
| 2013/0054962 A1 | 2/2013 | Chawla et al. | |
| 2013/0095805 A1 | 4/2013 | Lebeau et al. | |
| 2013/0325484 A1 | 5/2013 | Chakladar et al. | |
| 2014/0004829 A1 * | 1/2014 | Rieger | H04W 12/12 |
| | | | 455/411 |
| 2014/0274203 A1 | 9/2014 | Ganong, III et al. | |
| 2014/0343949 A1 | 11/2014 | Huang et al. | |
| 2015/0050922 A1 * | 2/2015 | Ramalingam | H04W 12/08 |
| | | | 455/418 |
| 2015/0186636 A1 * | 7/2015 | Tharappel | G06F 21/32 |
| | | | 726/8 |
| 2015/0319407 A1 | 11/2015 | Frankel et al. | |
| 2016/0027440 A1 | 1/2016 | Gelfenbeyn et al. | |
| 2016/0085348 A1 * | 3/2016 | Krause | G06F 3/038 |
| | | | 345/173 |
| 2016/0094338 A1 | 3/2016 | Pappachan et al. | |
| 2016/0350068 A1 | 12/2016 | Fournier et al. | |
| 2016/0365101 A1 * | 12/2016 | Foy | G10L 15/28 |
| 2017/0012982 A1 * | 1/2017 | Carter | G06F 21/60 |

OTHER PUBLICATIONS www.networkworld.com [online]. "Voice hackers can record your voice then use morpher to trick authentication systems," Sep. 30, 2015 [retrieved on Dec. 7, 2012] Retrieved from the Internet: URL<http://www.networkworld.com/article/2988133/security/voice-hackers-can-record-your-voice-then-use-morpher-to-trick-authentication-systems.html.

www.georgetown.edu [online]. "Hidden Voice Commands," Aug. 2016 [retrieved on Dec. 7, 2016] Retrieved from the Internet: URL<https://www.georgetown.edu/sites/www/files/Hidden%20Voice%20Commands%20full%20paper.pdf.

www.venture beat.com [online] "How Nuance tapped the cloud to bring voice recognition to mobile . . . and beyond," Sep. 8, 2013, [Retrieved on Dec. 7, 2016] Retrieved from the Internet:URL<http://venturebeat.com/2013/09/08/how-nuance-tapped-the-cloud-to-bring-voice-recognition-to-mobile/.

International Search Report and Written Opinion issued in International Application No. PCT/US2017/044842, dated Nov. 6, 2017, 16 pages.

* cited by examiner

SECURING AUDIO DATA

BACKGROUND

The present specification relates generally to security techniques for handling audio data.

Internet-connected devices frequently become compromised by malicious attackers. Connected devices are becoming more complex and being granted access to users' data. Many of connected devices include microphones and speakers. One potential attack on these devices is for a malicious attacker to compromise a connected device and listen to in-room audio using microphones of the connected device.

SUMMARY

In some implementations, security can be enhanced by restricting the ability of a device to access audio data that the device acquires. For example, audio detected by a microphone of a device may be encrypted or otherwise made inaccessible to the device. When the device has a legitimate need for the audio data, the device can be granted authorization to access audio detected during a limited period of time. During this limited period of time, audio detected by the microphone is not encrypted, allowing the device to access the audio. A secure module of the device can switch between providing encrypted audio and unencrypted audio depending on the context of the device. In addition, as discussed below, various techniques can enable the device to receive and respond to voice commands, even while the audio is encrypted so the device cannot access the audio for the command.

As an example, a device can include a processing module connected to a microphone. The processing module can be configured to control access to the audio received at the microphone by the device. Specifically, the processing module can restrict access to detected audio by encrypting audio data in a manner that the device cannot access it. When the device needs to access detected audio, the processing module can accept a token from a trusted source, e.g., a remote server that the device communicates with through a network such as the Internet. The token can authorize the device to access to the unencrypted audio. Once the token is verified, the processing module allows the device to receive unencrypted audio data. The token can indicate a predetermined amount of time during which audio data can be detected and passed unencrypted to the device. As such, the processing module can authorize access to the audio by the device for a limited period of time, and restrict access to the audio once the limited period of time has ended.

One innovative aspect of the subject matter described in this specification is embodied in methods that include the actions of restricting, by a processing module of a device, access by the device to audio information detected by a microphone, receiving, by the processing module, data indicating that the device is authorized to access audio information detected by the microphone during a limited period of time, and in response to receiving data indicating that the device is authorized to access audio information detected by the microphone during the limited period of time, providing audio information to the device. The methods can also include the actions of monitoring, by the processing module, audio information detected by the microphone during the limited period of time for the presence of a hotword, and after the end of the limited period of time, restricting, by the processing module, access by the device to audio information detected by the microphone.

Other implementations of this and other aspects include corresponding systems, apparatus, and computer programs, configured to perform the actions of the methods, encoded on computer storage devices.

Implementations may each optionally include one or more of the following features. For instance, the methods can include restricting access to audio information detected by the microphone in response to determining that the limited period of time has ended. The methods can also include receiving a token indicating (i) that the device is authorized to access the audio information detected by the microphone during the limited period of time and (ii) a duration of the limited period of time, evaluating the token to verify a validity of the token, and in response to verifying the validity of the token, extracting data of the token indicating (i) that the device is authorized to access the audio information detected by the microphone during the limited period of time and (ii) a duration of the limited period of time. Additionally, the methods can include at least one of encrypting the audio information detected by the microphone, or blocking access of the audio information from the processing module to the device.

Further, the methods can include detecting the presence of the hotword during the limited period of time, and in response to detecting the presence of the hotword during the limited period of time, restricting, during the limited period of time, access by the device to audio information that is detected by the microphone and that follows the hotword. In this instance, the methods can include detecting, during the limited period of time, a presence of a command that follows the hotword, determining that the command has ended during the limited period of time, and in response to determining that the command has ended during the limited period of time, providing audio information to the device until the end of the limited period of time.

In some aspects, the methods can also include after determining that the command has ended during the limited period of time, detecting, during the limited period of time, a presence of a question that occurs before another hotword is detected, and in response to detecting the presence of the question that occurs before another hotword is detected during the limited period of time, providing audio information to the device until the end of the limited period of time. Additionally, the methods can include receiving a request to access audio information detected by the microphone, wherein the request is provided by the device in response to a trigger of the device. In this instance, the methods can include associating the request with a value derived from an identifier for the processing module and a time.

Advantageous implementations can include one or more of the following features. In some implementations, the technology enables a device to seamlessly transition between a first mode that allows access to unencrypted audio data and a second mode that restricts access by encrypting audio data. The transition can be made based on a context of the device when audio is received by the device. In some implementations, the device is able to seamlessly transition between providing unencrypted audio data and providing encrypted audio data using trusted sources such as a processing module located at the device and a remote server. The processing module can be configured to control transitions based on the current context or situation.

In general, the encryption of audio can be used as a default or baseline operating mode. This provides enhanced security. If a device were hacked or otherwise compromised device, an attacker could potentially obtain all information on the device, including audio data being generated based on microphone input. However, by encrypting audio during standard operation, the encryption of the audio data would prevent an attacker from eavesdropping on the detected audio.

The techniques described in this document also provide secure voice command processing. A device can include a secure processing module, separate from the host processor of the device, that directly receives audio information and controls access to audio data. The processing module can facilitate secure processing of voice commands by detecting hotwords that signal voice actions, such as spoken commands and queries. For example, when a hotword is detected, the processing module can cause encrypted audio data to be sent to a server system. The server system can process the audio and instruct the device to perform the command requested by the user. In this manner, voice commands are accepted and performed by a device, while the device cannot intercept or alter the audio of the voice command.

The security benefits described above can be obtained while selectively allowing devices such as intercoms to use audio input when appropriate. When an appropriate event or condition occurs, the processing module can provide raw or unencrypted audio for a limited period of time, after verifying that the device is authorized to access to the audio. At the end of the limited period of time, the processing module can transition back to encrypting audio that is subsequently received. This technique increases confidentiality of received audio data in non-trusted devices through the use of a trusted processing module located at the device and through communication with a trusted, remote server. As such, the technique can be used to mitigate malicious attacks in which attackers seek to listen in on in-room audio and/or transmit malicious commands from non-trusted devices to trusted servers.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
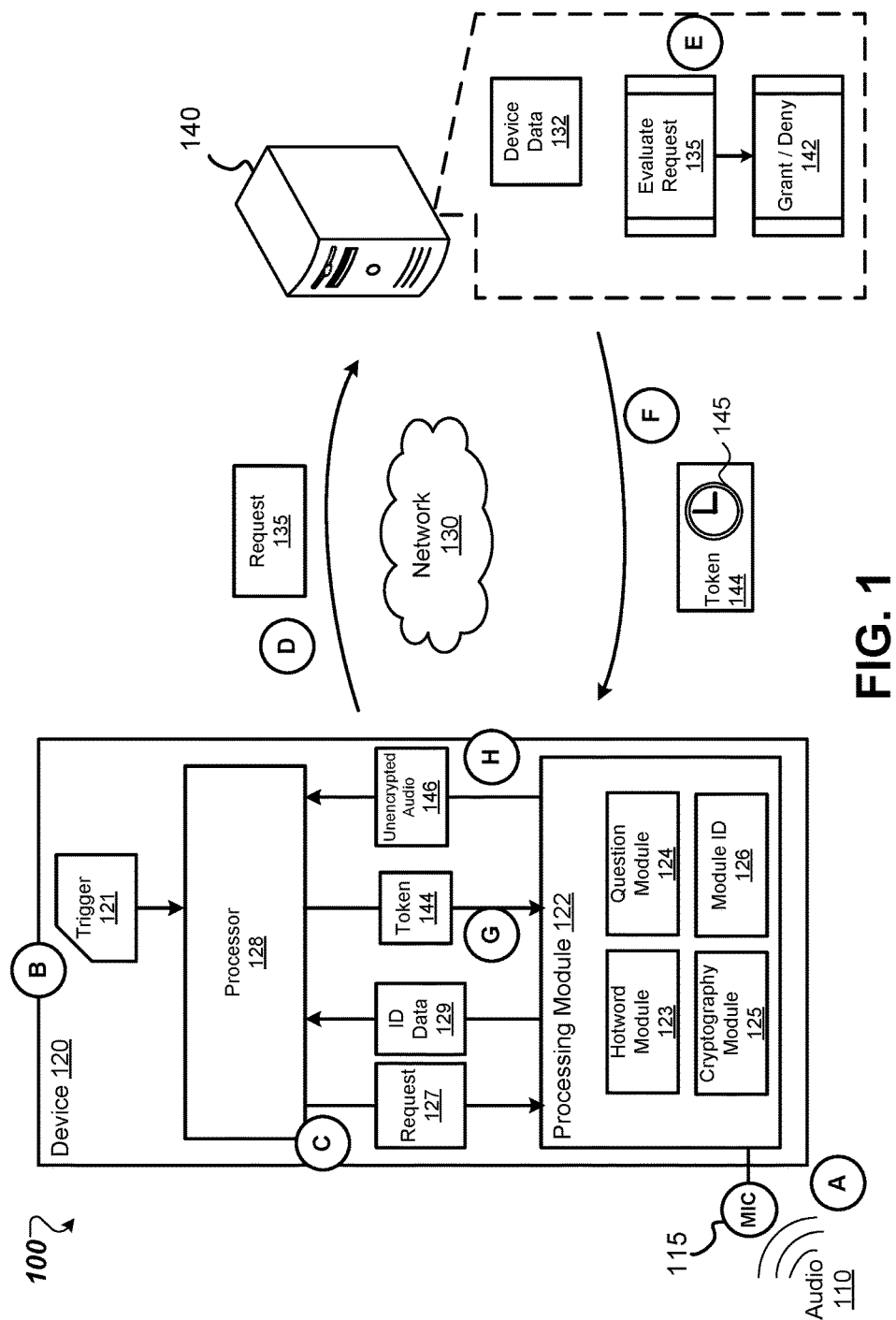
FIG. 1 is a diagram of an example system for securing audio data.

FIG. 1 is a diagram of a system 100 for securing audio data. The system can make context-based switches between providing encrypted audio data and unencrypted audio data. The system 100 enables audio to be encrypted to enhance security. The system 100 also enables unencrypted audio to be provided at certain times, when appropriate for a device to carry out legitimate functions.

The system 100 includes a device 120 and a server 140 that communicate via a network 130. The network 130 can include one or more public or private networks and may include the Internet. The device 120 may communicate over the network 130 using one or more wired or wireless networks such as Ethernet, a LAN, a WAN, Wi-Fi, BLUETOOTH, and the like. The device 120 can be any of various types of devices such as a desktop, a laptop, a smartphone, a tablet, and the like. In some implementations, the device 120 is a device such as an intercom system, a baby monitor, a karaoke machine, or other device that uses microphone input during its operation. The device 120 includes a processor 128 that handles the primary functions of the device 120. The device 120 can also include a microphone 115 for receiving raw audio 110. The microphone 115 can represent one or more microphones that are integrated in the device 120 and/or are in communication with the device 120.

In addition, the device 120 includes a separate processing module 122 that manages various audio-related processing tasks. The processing module 122 can be a voice assistant module that enables the device 120 to accept and respond to voice actions, such as voice commands and voice queries. For example, the processing module 122 can determine that a hotword was spoken, and designate audio data occurring after the hotword for transmission to the server 140. The processing module 122 can include a hotword module 123 to detect the presence of a hotword, e.g., a predetermined key word or phrase, in received audio. The processing module 124 may also include a question module 124 to detect whether a spoken follow-up request has occurred without being immediately preceded by a hotword.

The processing module 122 can be a secured hardware module that is integrated with the host device 202. The processing module 122 may be implemented as, for example, one or more semiconductor chips, a card, a circuit board, or other electronic module. The operations of the processing module 122 can be performed using analog and/or digital circuitry. For example, the processing module 122 can include a general purpose processor, a digital signal processor, an analog to digital converter, and/or other processing elements. The processing module 122 can include one or more data storage devices, including volatile or non-volatile memory, which can store software, firmware, settings, data, and so on.

In some implementations, the processing module 122 is provided by a third party and operates in a different security domain from the device 120. As a result, even if the device 120 is compromised, the processing module 122 operates independently to encrypt audio, securely handle voice commands, and decide when the device 120 is permitted to receive unencrypted audio data. In some implementations, the processing module 122 directly receives audio input received through a microphone 115 of the device 120. In other words, detected audio for the device 120 may be routed through the processing module 122, and the device 120 may be blocked from accessing the detected audio unless permitted by the processing module 122. The processing module 122 can include a cryptography module 125 to encrypt audio data. The processing module 122 can also store a module identifier 126. In some implementations, the module identifier 126 is a unique identifier that distinguishes the processing module 122 from all other processing modules of other devices.

In some implementations, the processing module 122 does not include a direct network interface for communicating with the server 140. Rather, the processing module 122 can communicate with the processor 128 and rely on the device 120 to transmit and receive messages for the processing module 122.

The device 120 can include a user interface, sensor, or element that generates trigger data 121 for indicating a requested transition between encrypted and unencrypted audio. For example, an intercom system may include a button that a person may press to initiate a call. When a user presses the button, the device 120 may generate trigger data 121 indicating that the device 120 needs to access detected audio from the microphone 115.

In general, the processing module 122 can encrypt audio data detected by the microphone 115 as a default or baseline operating mode. In this manner, the processing module 122 can be configured to restrict access to audio data that is received by the microphone, even from the device 120 that includes the processing module 122. In the example of FIG. 1, as a default or baseline operating state, the processing module 122 encrypts all received audio to restrict access to the received audio by the device 120.

At times, the device 120 may have a legitimate need to use the audio data generated by the microphone 115. To facilitate this use, the processing module 122 can communicate with the server 140 to determine whether the device 120 should be granted access to detected audio. For example, each time the device 120 needs to access audio from the microphone, the device 120 can send a request for access to received audio to the server 140. If the device 120 is authorized, the processing module 122 can then receive a token from the server 140 indicating that device 120 is authorized to receive the audio. The processing module can be configured to verify the authenticity of the received token, and provide unencrypted audio to the device 120 in response to verifying the token. After the limited period of time ends, the processing module 122 can automatically stop providing unencrypted audio to the device 120, and resume encrypting audio that is detected.

At step (A), audio 110 is received at the microphone 115 of the device 120. The audio 110 can include raw audio that is received at the microphone 115. The audio 110 can include various types of audio in the environment of the device 120. The audio 110 can be transmitted directly to the processing module 122 for handling. Generally, the processing module 122 does not provide audio to the device 120 or the server 140. However, the processing module 122 can monitor audio for the presence of a hotword that signals the beginning of a voice action, such as a voice command or voice query. If a hotword is detected, the processing module 122 can encrypt the subsequent audio and have the processor 128 of the device 120 send the encrypted audio data to the server 140. The server 140 then processes the audio to initiate commands requested by the user. The processing module 122 can be configured to initially encrypt all received audio information that leaves the processing module 122 so that the device 120 cannot access detected audio.

At step (B), the device 120 receives or generates trigger data 121 indicating that the device 120 needs access to audio data obtained using the microphone 115. For example, the trigger data 121 can indicate a condition or event, such as a user input to a button, a slider, a touchscreen, or other user interface element. As an example, the device 120 may be an intercom device, and the trigger data 121 may indicate that a person pressed a button to initiate a call. Based on the trigger data 121, the device 120 determines that it needs access to audio from the microphone 115.

At step (C), in response to the trigger data 121, the processor 128 generates a request 135 for access to detected audio. For example, the request 135 can be a request for a token that enables the device 120 to access audio data for a limited period of time.

In some implementations, as part of generating the request 135 for access to audio data, the processor 128 sends a request 127 to the processing module 122 to obtain information. In response to the request 127, the processing module 122 can generate and provide identifying data 129 or other data to be included in the request 135. The identifying data 129 can indicate or be derived from the module identifier 126 for the processing module 122. The identifying data 129 may also include or be derived from a time, such as the current time. For example, the processing module 122 may generate the identifying data 129 by encrypting a set of data that includes the module identifier 126 and other information that varies, such as time. The module identifier 126 indicates to the server 140 which processing module 122 the request 135 corresponds to. The use of information that varies, such as the current time, ensures that the encrypted data changes for each session. Further, providing the time of the request 135 helps to prevent replay attacks, since identifying data 129 that is later reused would show a time that not current.

As noted above, the identifying data 129 can be encrypted or otherwise securely encoded, e.g., using a signature or hash, so that the identifying data 129 cannot be read, or at least cannot be altered without the change being detectible. Because information from the processing module 122 is sent through the device 120, which is assumed to be insecure, communications from the processing module 122 to the server 140 generally can use encryption or other techniques so that the server 140 can identify the device 120 and avoid or detect tampering.

At step (D), the device 120 sends the request 135, including the identifying data 129 from the processing module 122, to the server 140 over the network 130. The server 140 can include one or more servers that are remote from the device 120. The server 140 can be a trusted system that is configured to receive the request 135. The server 140 can be configured to grant or deny the request 135 based on the identifying data 129 in the request 135, known characteristics of the device 120, and/or other information.

At step (E), the server 140 evaluates the request 135 and generates a response that grants or denies access to received audio. As discussed below, the response can be a secure token 144 that indicates that the device 120 is authorized to access audio from the microphone 115. If accessing the audio is not appropriate, the server 140 can provide a response that indicates that access should be denied. In some implementations, the response denying access may be provided in the form of a secure token.

The server 140 can perform a number of determinations to assess whether access should be granted. For example, the server 140 can verify the integrity of the request 135. The server 140 can decrypt or otherwise decode the identifying data 129 in the request 135, and extract information used for verification. As discussed above, this identifying data 129 can indicate, for example, the module identifier 126, the time the request for access is made, or other information. The encryption of this information with a key known to both the server 140 and the processing module 122 can demonstrate validity of the identifying data 129 and thus the request 135. Similarly, the identifying data may include an accompanying hash or signature that the server 140 may use to verify the authenticity of the request 135.

The server 140 may use information from the identifying data 129 to determine whether the request should be granted. For example, the server 140 may extract a time from the identifying data 129 or another part of the request 135. The server 140 may compare the extracted time to the time the request 135. If the time that the request 135 was received by the server 140 is within a threshold amount of time from the extracted time, e.g., within 15 seconds, within 1 minute, etc., the server 140 may determine that the request 135 is current. If the server 140 received the request 135 more than a maximum amount of time after the extracted time, than the server 140 determines that the request 135 is invalid and should be denied.

The server 140 can extract the module identifier 126 from the identifying data 129 and use the module identifier 126 to look up information about the device 120 that includes the particular processing module 122. For example, the server 140 can access device data 132 that maps processing module identifiers to corresponding device types. Other information, such as a model number of the device 120, a manufacturer of the device, and capabilities of the device 120 may also be stored in the device data 132. The device data 132 may be populated using information from device manufacturers, e.g., to indicate that certain sets of processing modules are being associated with certain device types.

Devices may be required to be of a certain type in order for access to audio data to be granted. Some types of devices may include the processing module 122 to permit voice assistant functionality, but have no need to use detected audio for their operation. For example, it may be desirable for a smart clothes washing machine to respond to user voice requests, but the washing machine does not require audio to operate. For these types of devices, the server 140 may deny access to audio data as a matter of course. By contrast, other devices, such as intercoms, baby monitors, karaoke machines, and the like may require detected audio for purposes other than responding to user voice requests. The server 140 can use the device data 132 to verify that a request comes from an appropriate device that has a legitimate use for audio as part of the evaluation of the request 135. In the example of FIG. 1, the server determines that the device 120 is an intercom, and so the server 140 determines that the device 120 is an appropriate type of device to receive audio data.

The server 140 may perform other determinations when evaluating a request 135. For example, the server 140 may access user account data and identify a user account that the device 120 is associated with. For example, the server 140 may look up the module identifier 126 extracted from the request 135. The user account may indicate various types of information, including preferences of the user, security levels or permissions granted to devices, the status or locations of other devices, access histories, and so on that the server 140 may use to evaluate the request 135. Similarly, the request 135 may include information indicating a state of the device 120 or a requested use of the audio data. These also may be evaluated by the server 140 to determine whether access is appropriate.

If the server 140 determines that the request 135 is authentic, current (e.g., not delayed or repeated), and is for an appropriate type of device, the server 140 generates a token 144 that indicates that the device 120 should be granted access to audio data. The token 144 can indicate a limited period of time 145 that the device 120 may obtain access to audio data. This limited period of time may be indicated as an expiration time, a length of time, a time range, or in another manner. In the case of an intercom, the server 140 may indicate that the device 120 should receive access for, e.g., only one minute, or two minutes. The amount of time that authorization lasts may be based on the type of device 120. For example, the server 140 may determine that a karaoke machine is authorized for a longer amount of time, such as 5 minutes, or that a baby monitor is authorized for 15 minutes. The amount of time may also vary depending on a task or other context indicated by the request 135. The data indicating the authorization of the device 120 to receive audio and the data indicating the limited period of time may be encrypted or otherwise securely encoded by the server 140 so that the information cannot be falsified.

In some implementations, the server 140 sends a request to a user device for user confirmation before providing the device 120 access to audio. For example, before generating and sending a token 144 in response to the request 135, the server 140 may determine that the device 120 is registered to a user account for a particular user. From user account data, the server 140 may identify a user device associated with the user account, such as the user's phone, and send a notification that the device 120 has requested access to audio data. The notification may include a user interface, such as buttons or other areas displayed a touchscreen, that the user may interact with to allow or deny access. For example, the notification can ask, "Do you want to use your intercom now?" and give the user an option to select yes or no. In this manner, users can be notified when devices are attempting to access audio, and attempted eavesdropping by a compromised device can be detected and prevented.

In step (F), the server 140 transmits the token 144 to the device 120 via the network 130. The device 120 receives the token 144. However, because the token data is encrypted or otherwise securely encoded, the device 120 generally cannot read the data. Further, since the processing module 122 controls access to audio data generated using the microphone 115, the device 120 does not receive audio until the processing module 122 switches to a mode that provides unencrypted audio data.

In step (G), the device 120 provides the token to the processing module 122 and the processing module evaluates the token 144. The processing module 122 can be configured to verify a validity of the token 144. As such, the processing module 122 can decrypt or otherwise decode the token 144 to determine whether or not permit the device 120 access to the received audio data. Similar to generation of the identifying data 129, the token 144 can be generated with a time or other information that allows the processing module 122 to verify that the token is current and not outdated. For example, the processing module 122 can compare an extracted time value with a time that the token 144 was received by the processing module 122. If the two times are within a threshold amount of time of each other, the request can be determined to be current. Otherwise, the token 144 can be ignored as potentially outdated or a potential repeat of a previous token. As another example, the token may include data that can be matched with data in the identifying data. For example, the token 144 may include a secret or random value encoded in the identifying data 129, demonstrating that the token 144 was generated using the secret value for the same device 120 and the same session.

The token 144 indicates whether the device 120 is authorized to receive audio data from the microphone 115. In some implementations, a token 144 is provided even if authorization is denied. This can provide the device 120 and/or processing module 122 at least the confirmation that the request 135 was received and answered.

In addition, the processing module 122 can determine, based on the token 144, a limited period of time 145 that the device 120 may access the received audio data. As noted above, this may be determined in any appropriate form, e.g., a duration of time, an expiration for the authorization, a range of time that authorization lasts, and so on. For example, if the processing module 122 determines that the device 120 may be granted permission to access the audio data, the processing module 122 can switch to an unencrypted audio mode and pass the raw or unencrypted audio 146 to the processor 128 for the limited period of time 145. The unencrypted audio channel may be referred to as the unencrypted audio mode and the encrypted audio channel may be referred to as the encrypted audio mode, as discussed further herein.

In step (H), after the token 144 is verified and the processing module 122 has determined that the device 120 is authorized to access to the audio data, the processing module 122 provides unencrypted audio to the processor 128 of the device 120. For example, the processing module 122 may begin to provide audio data in substantially real time once the authorization is verified. This access may allow the device 120 to use the audio data in substantially the same manner as if the device 120 had a direct connection to the microphone 115 or typical analog to digital audio processing hardware that is unsecured. That is, in some implementations, the processor 128 may have substantially unrestricted access to audio data detected during the limited period of time 145. Thus, a device such as an intercom can provide audio for an ongoing call unimpeded and without delay. The processing module 122 may continue to provide unencrypted audio as audio is received.

At the end of the limited period of time 145, the processing module 122 automatically transitions back to restricting access to audio detected by the microphone 115. For example, the cryptography module 125 can be used to encrypt audio detected after the limited period of time 145 ends, so that the device 120 is once again restricted from accessing the audio data. To access audio again, the device 120 may initiate a new request for authorization, for example, by detecting that audio is needed and initiating the generation of a request in the same manner discussed for the request 135.

In some aspects, the processing module 122 can be configured to detect hotwords while unencrypted audio is being provided to the device 120, e.g., during the limited period of time 145. The processing module 122 may use the hotword module 123 to perform this function. The hotword module 123 can implement a hotword detection model, which may include a trained machine learning model, such as a neural network, a maximum entropy classifier, and so on. The hotword module 123 can use the same hotword detection model used to detect hotwords that occur while audio access is restricted, or may use a different hotword detection model. In some implementations, one or more parameters of the hotword module 123 may be different when operating during the period that audio is restricted and during the period when audio is unrestricted.

In some instances, the detection of a hotword or voice command may interrupt the open access of device 120 to received audio. In this manner, voice commands and other user requests that are intended for a voice assistant and not for the device 120 can be securely routed to the server 140. During the limited period of time 145 that audio is made available to the device 120, the audio is provided to the device 120 and also monitored using the hotword module 123. If the hotword module 123 detects a hotword, e.g., with at least a minimum level of confidence, the device's access to the audio may be restricted, even if the limited period of time 145 of authorization has not ended. Thus the detection of a hotword may prompt the processing module 122 to transition from providing unencrypted audio for use by the device 120 to providing encrypted audio to be sent to the server 140. As such, upon the detection of a hotword, the hotword module 123 can pass a signal to the processing module 122 to restrict access to the audio data by the device 120. This allows the processing module 122 to receive user voice requests in an encrypted audio mode until the end of the voice request is detected. Thus, commands and other requests may be received at the device 120 without sacrificing the confidentiality of the command during the limited period of time 145 that the device 120 is authorized to access audio data.

The processing module 122 may include a voice activity detector or other functionality to determine the end of a user's voice request. For example, after a hotword and an immediately subsequent voice command, the voice activity detector may detect a pause in speaking of at least a predetermined minimum duration, e.g., 2 seconds, 5 seconds, etc. This can indicate to the processing module 122 that the user request corresponding to the hotword has ended. When the user request has ended, the processing module 122 may stop providing encrypted audio to be sent to the server 140. The processing module 122 also determines whether the limited period of time 145 has ended. If the limited period of time 145 has ended, the processing module 122 continues blocking access to the audio, e.g., by providing no audio data to the device 120 or providing only encrypted audio data that is not accessible by the device 120. If the limited period of time has not ended, however, the processing module 122 returns to the unencrypted mode, and again provides unencryped audio The processing module 122 can also be configured to handle certain commands that are not immediately preceded by a hotword. Sometimes, after a user has spoken a hotword and a first voice request, a user may pause and later make a second voice request without speaking a second hotword. For example, a user may speak a hotword, e.g., "Okay phone," and ask "Order a pepperoni pizza." After the command has ended and potentially after the action is completed, the user may follow-up with a second voice request, "When will the pizza arrive?", in an attempt to continue the conversation with the virtual assistant without speaking a hotword before the second request. In this instance, only one hotword may be detected for both a command and a follow up question to be received by the processing module 122. To detect these types of follow-up requests or other requests that are not preceded by a hotword, the processing module 122 can use the question module 124.

The question module 124 can operate by assessing speech characteristics during a certain duration after the end of a known user voice request. Similar to the hotword module 123, the question module 124 can include an audio processing model, for example, a trained machine learning model such as a neural network, a classifier, and so on. For example, the question module 124 may monitor audio for a potential follow-up request during a period of time, e.g., 30 seconds, 1 minute, etc., after the end of the prior request. During this time the question module 124 can monitor sound characteristics, such as a voice inflection, to generate a likelihood score indicating an estimated likelihood that a follow-up request has been made. Similarly, the question module 124 may detect non-hotword terms that signal a possible question, e.g., who, what, where, why, when, how, etc., and use that information alone or in combination with other data to generate a likelihood score. When the likelihood score satisfies a threshold, the processing module 122 can treat the audio as a potential user voice request, e.g., by transitioning to an encrypted mode and providing encrypted audio to the server 140 as a potential voice command.

Figure 2:
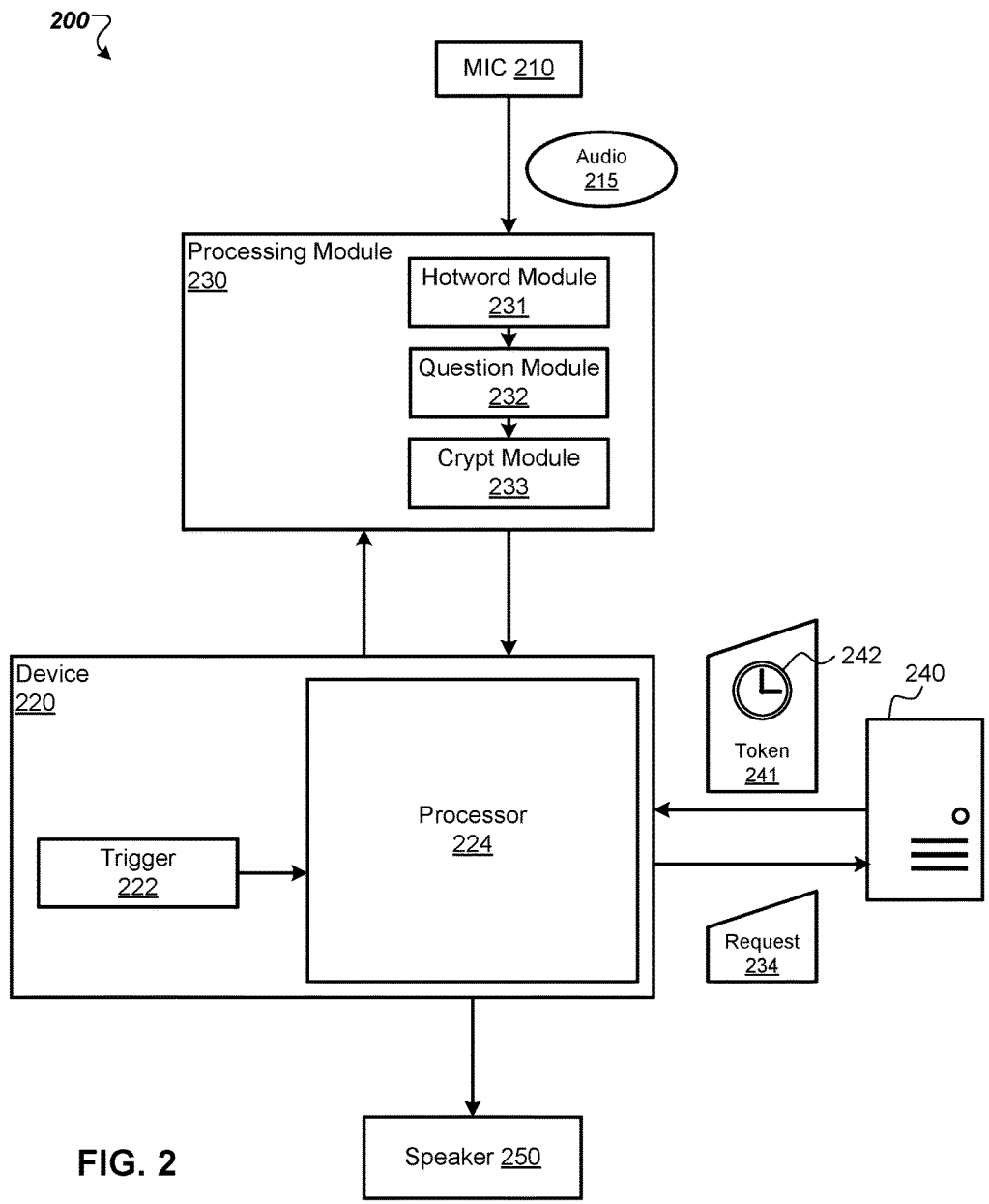
FIG. 2 is a diagram of an example architecture for securing audio data.

FIG. 2 is a diagram of an example architecture 200 for context-based switches between encrypted and unencrypted audio. The architecture 200 for context-based switches between encrypted and unencrypted audio includes a microphone 210, a device 220, a processing module 230, a server 240, and a speaker 250. The architecture 200 illustrates a block diagram in which audio data is processed to transition between encrypted and unencrypted audio channels. The audio data may transition between the encrypted and unencrypted audio channels in response to a trigger as well as in response to specific content of the received audio data.

The microphone 210 includes one or more microphones that persistently transmit raw audio 215. The microphone 210 is connected to the processing module 230. The microphone 210 passes received audio to the processing module 230. The processing module 230 can be configured to encrypt the audio data via an cryptography module 233. In some implementations, all received audio 215 is initially be encrypted by the cryptography module 233.

As audio 215 is received by the microphone 210 and transmitted to the processing module 230 for encryption, a trigger 222 of the device 220 may be initiated. The trigger 222 can indicate a request for access to the audio data by the device 220. For example, the trigger 222 can be a button of an intercom system in which a request to transmit unencrypted audio over the intercom system is initiated. The trigger 222 can initiate the generation of a request 234 by a processor 224 of the device 220.

In response to the trigger 222, the processor 224 may generate the request 234 and pass the request 234 to the processing module 230. The processing module 230 can be configured to add an encrypted value to the request 234. The encrypted value can include an identifier for the processing module 230 as well as a time. In some aspects, the time corresponds to the time at which the request 234 is generated. In other aspects, the time corresponds to the time at which the trigger 222 is actuated. The identifier for the processing module 230 can specify an owner of the device 220 and/or a type of the device 220. In some implementations, the encrypted value is a hash. The request 234 may be passed back to the processor 224 after the encrypted value is added to the request 234. The request 234 can be transmitted from the device 220 to the server 240 for validation of the request 234.

The server 240 can be configured to receive the request 234 and verify the integrity of the request 234. In other words, the server 240 can be configured to determine whether or not to allow the device 220 to access the audio data. The server 240 can be configured to verify the request 234 based on the encrypted value of the request 234. Specifically, the server 240 can be configured to verify an integrity of the request 234 by looking up information corresponding to the encrypted value. The server 240 can be configured to determine whether or not the device 220 is to be trusted based on the identifier for the processing module 230 and the time associated with the request 234. For example, the server 240 can access a lookup table including a list of verified identifiers. In this instance, the server 240 can be configured to compare the identifier of the encrypted value with the lookup table to verify the integrity of the request. Specifically, if the identifier of the encrypted value exists in the lookup table, and the identifier is associated with an appropriate type of device, the device 220 may be permitted access to the audio data for a limited period of time. Otherwise, if the identified of the encrypted value does not exist in the lookup table, or if an indicated device type does not qualify for receiving audio data, the server 240 will not grant access for the device 220 to access the audio data.

If the server 240 determines that the request 234 is valid and that access authorization is appropriate, the server 240 generates a token 241 encoding a limited amount of time 242 that the device 220 may access the audio. Otherwise, if the server 240 does not determine that the request is valid, the server 240 generates a token 241 encoding a command to disregard to the request for access to the encrypted audio and to continue restricting access to the audio data by the device 220.

The server 240 can be configured to transmit the token 241 to the device 220. The device 220 can be configured to pass the token 241 to the processing module 230 via the processor 224. The processing module 230 can be configured to decode the token 241. Specifically, the processing module 230 can be configured to evaluate the token 241 to verify a validity of the token 241, to verify permission of the device 220 to access the audio data, and to extract a duration of time 242 that the device 220 may access the audio data (if the device 220 is being granted access to the audio data).

The processing module 230 can be configured to switch to an unencrypted audio mode using the cryptography module 233. In this instance, the cryptography module 233 can be used by the processing module to permit access to the audio data by the device for the limited period of time 242 (as indicated by the token 241). The processing module 230 can be configured to pass the audio 215 from the microphone 210 to the device 220 as unencrypted audio data for the limited period of time.

The device 220 can be configured to receive the unencrypted audio data using the processor 224 via the unencrypted audio channel from the processing module 230. In some implementations, the unencrypted audio data can be transmitted to the speaker 250 by the processor 224. As such, the unencrypted audio data may be converted to sound for emission by the speaker 250. For example, in response to the actuation of a button press in an intercom system, the audio received at the intercom may be broadcast by one or more speakers as a result of the verification of a request to broadcast the received audio data.

In some implementations, the processing module 230 can further include a hotword module 231 and a question module 232. In this instance, the processing module 230 can be configured to detect for hotwords and questions within the received audio data during the limited period of time 242. For example, the hotword module 231 can be used by the processing module 230 to detect predetermined hotwords during the limited period of time 242. If a hotword is detected by the hotword module 231, the processing module 230 can be configured to transition from the unencrypted audio mode to the encrypted audio mode during the limited period of time 242. In some aspects, the detected hotword and the audio that follows the detected hotword is encrypted and transmitted from the device 220 to the server 240. As such, the hotword and the audio that follows the detected hotword may not be passed to the speaker 250.

In some implementations, the audio that follows the hotword can include a command. The command can be encrypted by the cryptography module 233 so that access to the command is restricted by the device 220. Thus, the command may be securely transmitted to the server 240 due to the transition from the unencrypted mode to the encrypted mode in response to the detection of the hotword during the limited period of time 242.

The audio that follows the hotword can additionally include a follow up question during the limited period of time 242. The follow up question may be detected by the question module 232. The question module 232 can be used by the processing module 230 to indicate that access to the audio data should remain restricted by the device 220. As such, if the processing module 230 detects a hotword via the hotword module 231, the audio data may be encrypted for a portion of time during the limited period of time 242 in which a command and/or a follow up question may be detected, for secure transmission of the command and/or the follow up question to the server 240.

Figure 3:
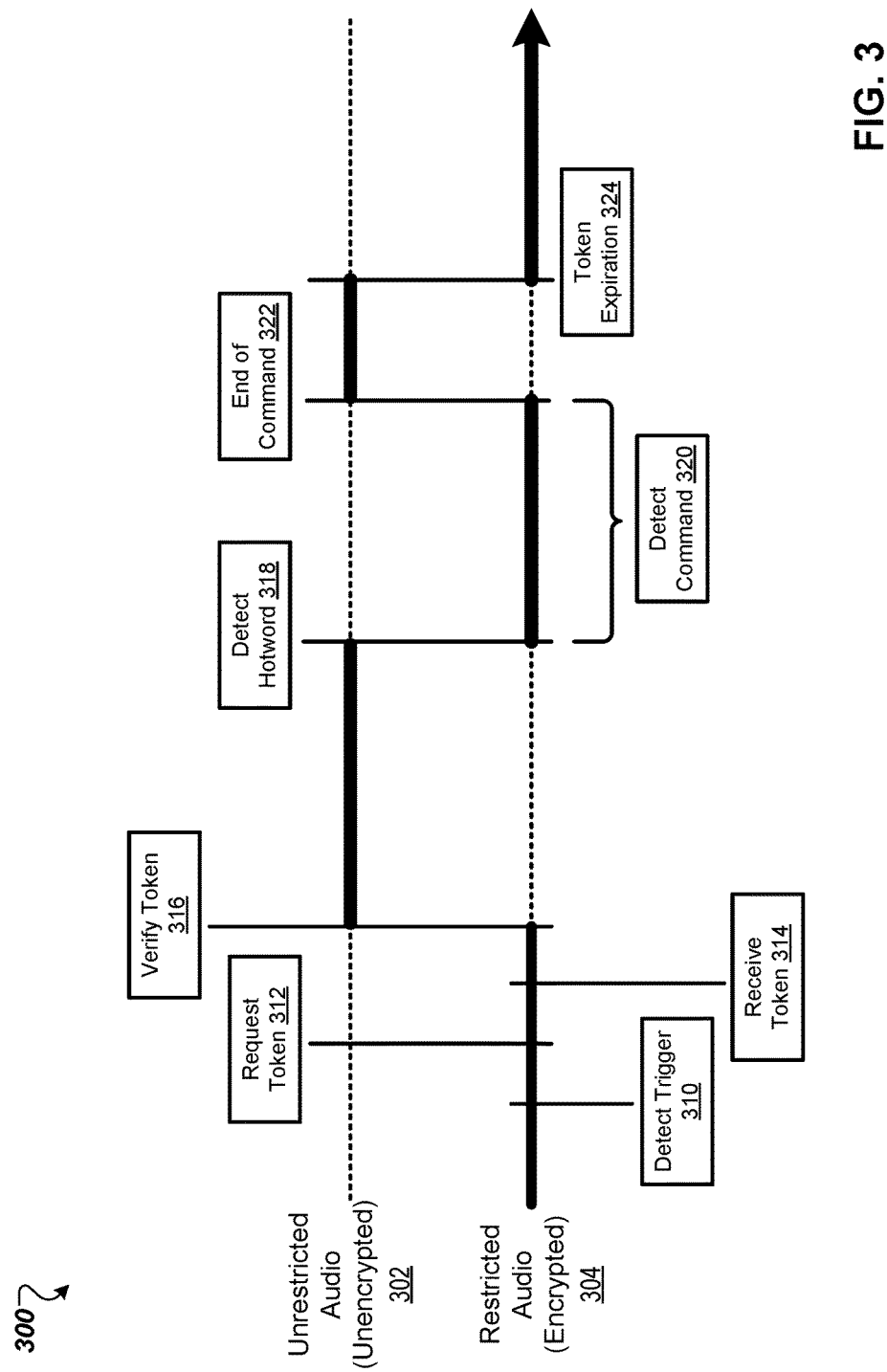
FIG. 3 is an event timeline showing examples of context-based switches between providing encrypted audio and unencrypted audio.

FIG. 3 is an event timeline 300 showing examples of context-based switches between providing encrypted audio and unencrypted audio. The timeline 300 shows a channel for unencrypted audio 302 and a channel for encrypted audio 304. Based on the events that occur along the timeline 300, the unencrypted audio channel 302 or the encrypted audio channel 304 may be used to transmit audio data from a processing module to a device.

At event 310, a trigger condition or even is detected at the device. At the time the trigger is detected, the processing module is restricting access to audio data by requiring any access to occur on the encrypted audio channel 304. The trigger can prompt the device to generate a request for authorization to access unencrypted audio data, which would require a transition from using the encrypted audio channel 304 to the unencrypted audio channel 302. Examples of devices that may require unencrypted audio data include an intercom system, a karaoke machine, a baby monitor, and the like. The trigger can be used to initialize the generation of a request for the transmission of unencrypted audio over the unencrypted audio channel 302.

At event 312, the device generates a request for access to audio data. The request for the token seeks to enable the device to access audio information. The request for a token can include an encrypted value that is generated by the processing module and passed to the device. The encrypted value can include an identifier for the processing module as well as a time at which the request is being generated. The request for the token can be generated by the device in combination with the processing module, and passed to a server for verification of the request. The encrypted audio channel 304 is continues to be used as the device has not yet been permitted access to audio information.

At event 314, the device receives a token from the server. The server can be configured to verify the request for the token based on the encrypted value of the request. As such, the server can be configured to transmit a generated token to the device based on the encrypted value of the request. The token can include information indicating whether or not the device is authorized to access the audio information detected by the microphone. Additionally, the token can include information specifying a limited period of time in which the device may access the audio data. The device continues to use the encrypted audio channel 304 until the token itself is verified by the processing module.

At event 316, the device passes the token to the processing module for verification. The processing module can be configured to verify the token. In response to verifying the validity of the token, the processing module can be configured to extract the information from the token indicating whether or not the device is authorized to access the audio information. Additionally, the processing module can be configured to extract the information from the token indicating the duration of the limited period of time. As shown in FIG. 3, if the processing module verifies the validity of the token, a transition from the encrypted audio channel 304 to the unencrypted audio channel 302 occurs. Thus, the device is permitted to access audio information once the token has been verified by the processing module.

At event 318, the processing module detects a hotword during the limited period of time. In response to detecting the hotword, the processing module transitions from the unencrypted audio 302 channel to the encrypted audio channel 304 during the limited period of time. As such, the audio following the hotword may be encrypted so that the audio following the hotword may not be accessed by the device.

At event 320, the processing module detects a command that follows the hotword. The command is detected by the processing module during the limited period of time over the encrypted audio channel 304. In some implementations, a follow up question may follow the command during the limited period of time, over the encrypted audio channel 304. The processing module can be configured to detect whether or not a follow up question is present.

In some aspects, the processing module passes the command and the follow up question via the encrypted audio channel 304 to the device. The device may be configured to securely transmit the command and the follow up question to the server. The server can be configured to decrypt the command and the follow up question. The command and the follow up question are restricted from being accessed by the device during the limited period of time since the audio data has transitioned from the unencrypted audio channel 302 to the encrypted audio channel 304 in response to the detection of hotword.

At event 322, the processing module detects the end of the command. As the end of the command is detected, the processing module transitions from the encrypted audio channel 304 to the unencrypted audio channel 302 during the limited period of time. In some aspects, the processing module detects a follow up question before the end of the command. In this instance, the processing module may be configured to detect the end of the follow up question and transition from the encrypted audio channel 304 to the unencrypted audio channel 302 upon the detection of the end of the follow up question. In an example, the processing module can be configured to detect for a follow up question for a portion of time after the detection of the end of a command and during the limited period of time. Thus, after the end of the portion of time in which detection for a follow up question occurs, the processing module transitions back to the unencrypted audio channel 302.

At event 324, the processing module detects the expiration of the limited period of time as indicated by the token. Upon the detection of the end of the limited period of time, the processing module transitions from the unencrypted audio channel 302 to the encrypted audio channel 302. As such, the processing module restricts access to the audio data by the device.

In some implementations, the limited period of time occurs prior to the end of the command. In this instance, the processing module transitions from the unencrypted audio channel 302 to the encrypted audio channel 302 before the end of the command. As such, the limited period of time defines a duration in which the unencrypted audio channel 302 may be used for a single verified token.

Figure 4:
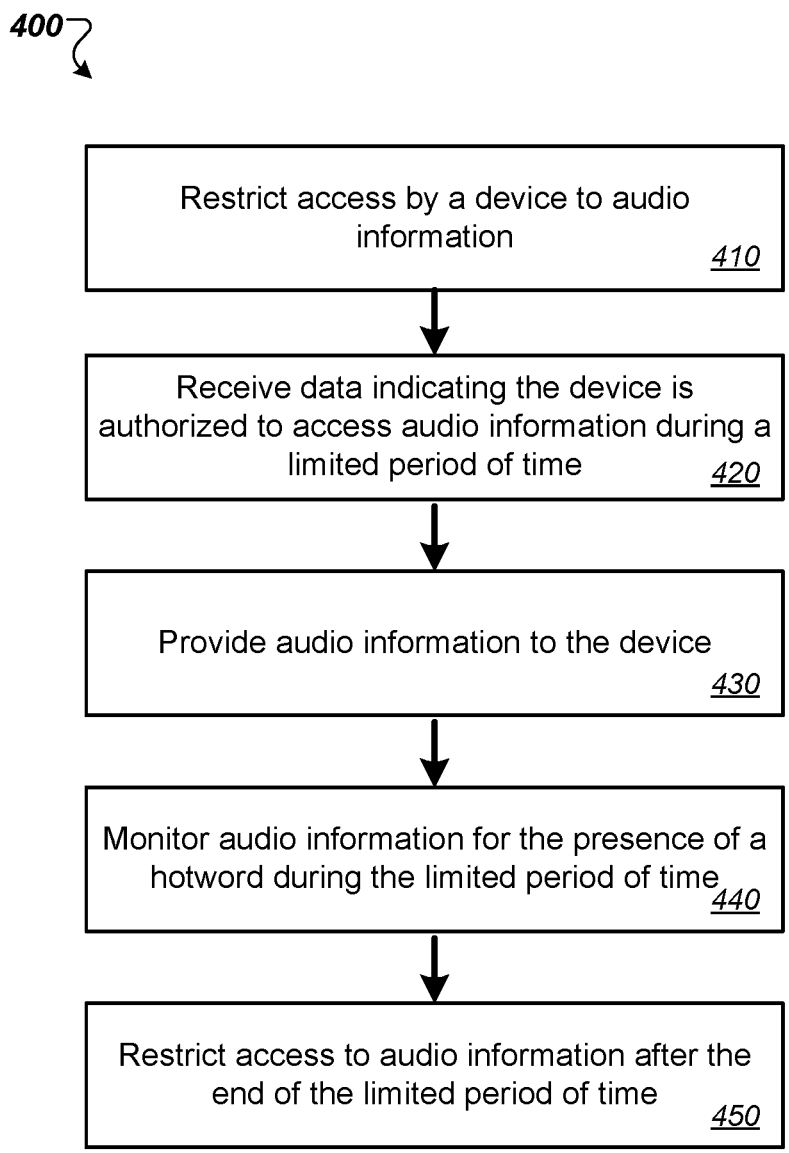
FIG. 4 is a flow chart illustrating an example process for securing audio data.

FIG. 4 is a flow chart illustrating an example process 400 for context-based switches between encrypted and unencrypted audio. For convenience, the process 400 will be described as being performed by a system of one or more computers located in one or more locations. For example, a system for context-based switches between encrypted and unencrypted audio, e.g., the system 100 for context-based switches between encrypted and unencrypted audio of FIG. 1, appropriately programmed in accordance with this specification can perform the process 400.

At step 410, a processing module of a device restricts access by the device to audio information. The audio information may be detected by a microphone in communication with the processing module. As such, the audio information may be passed to the processing module of the device where the audio information is encrypted. Access to the audio information by the device may be restricted due to the encryption of the audio information. In this instance, the encrypted audio information may still be passed to the device, however, the device may not access the audio information due to the encryption. In other aspects, access to the audio information by the device may be restricted by blocking access of the audio information from the processing module to the device entirely.

At step 420, the processing module receives data indicating the device is authorized to access audio information during a limited period of time. The processing module can receive data, such as a token, from a remote server. For example, the server can transmit a secure token to the device. The device can be configured to pass the secure token to the processing module for decoding. The processing module can decode the token to determine that the device is authorized to access audio information received by the microphone for a limited period of time as indicated by the token.

At step 430, the processing module provides audio information to the device. For example, the processing module can be configured to provide audio information to the device in response to decoding the token. In decoding the token, the processing module can extract information from the token that indicates the device is authorized to access audio information for a limited period of time. In some implementations, the processing module decodes the token to determine that the device is not authorized to access the audio information. In this instance the processing module continues to restrict access by the device to audio information.

At step 440, the processing module monitors audio information for the presence of a hotword during the limited period of time. In an example, if the processing module detects a hotword during the limited period of time, the processing module may restrict, during the limited period of time, access by the device to audio information that is detected by the microphone and that follows the hotword. Further, the processing module may detect a presence of a command that follows the hotword during the limited period of time. In this instance, the processing module can be configured to determine when the command has ended during the limited period of time. After determining that the command has ended during the limited period of time, the processing module can provide audio information to the device until the end of the limited period of time. In another example, after determining that the command has ended during the limited period of time, the processing module can be configured to detect, during the limited period of time, a presence of a question that occurs before another hotword is detected. In response to detecting the presence of the question, the processing module can be configured to provide audio information to the device until the end of the limited period of time.

At step 450, the processing module restricts access to audio information after the end of the limited period of time. In some implementations, the processing module restricts access to audio information detected by the microphone in response to determining that the limited period of time has ended. Access to the audio information by the device may be restricted via a transition from an unencrypted audio channel to an encrypted audio channel. In this instance, the encrypted audio information may still be passed to the device, however, the device may not access the audio information due to the encryption. In other aspects, access to the audio information by the device may be restricted by blocking access of the audio information from the processing module to the device entirely.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   restricting, by a processing module in a device, access by a processor in the device to audio information detected by a microphone in the device;
   receiving, by the processing module in the device, data from the processor in the device indicating that the processor in the device is authorized during a limited period of time to access audio information detected by the microphone in the device;
   in response to receiving data indicating that the processor in the device is authorized during the limited period of time to access audio information detected by the microphone in the device, providing the processor in the device access to audio information detected by the microphone in the device;
   monitoring, by the processing module in the device, audio information detected by the microphone in the device during the limited period of time for the presence of a hotword; and
   after the end of the limited period of time, restricting, by the processing module in the device, access by the processor in the device to audio information detected by the microphone in the device.

2. The method of claim 1, further comprising restricting access to audio information detected by the microphone in response to determining that the limited period of time has ended.

3. The method of claim 1, wherein receiving the data from the processor in the device indicating that the processor in the device is authorized during a limited period of time to access audio information detected by the microphone in the device comprises:

receiving a token from the processor indicating (i) that the processor in the device is authorized to access the audio information detected by the microphone during the limited period of time and (ii) a duration of the limited period of time;
wherein the method further comprises:
evaluating the token to verify validity of the token; and
in response to verifying the validity of the token, extracting data of the token indicating (i) that the processor in the device is authorized to access the audio information detected by the microphone during the limited period of time and (ii) a duration of the limited period of time.

4. The method of claim 1, wherein restricting access by the processor in the device to audio information detected by the microphone comprises at least one of:
encrypting the audio information detected by the microphone; or
blocking access of the audio information from the processing module to the processor in the device.

5. The method of claim 1, further comprising:
detecting the presence of the hotword during the limited period of time; and
in response to detecting the presence of the hotword during the limited period of time, restricting, during the limited period of time, access by the processor in the device to audio information that is detected by the microphone and that follows the hotword.

6. The method of claim 5, further comprising:
detecting, during the limited period of time, a voice request that follows the hotword, wherein the voice request is a spoken command or request;
determining that the voice request has ended before the end of the limited period of time; and
in response to determining that the voice request has ended before the end of the limited period of time, providing, to the processor in the device, unencrypted audio information detected after the end of the voice request.

7. The method of claim 6, further comprising:
after determining that the voice request has ended before the end of the limited period of time, and after providing unencrypted audio information detected after the end of the voice request, detecting a second voice request that occurs during the limited period of time and that is not preceded by an additional hotword; and
in response to detecting the second voice request that occurs during the limited period of time and is not preceded by an additional hotword, providing encrypted audio corresponding to the second voice request to the processor in the device.

8. The method of claim 1, further comprising receiving a request to access audio information detected by the microphone, wherein the request is provided by the processor in the device in response to detecting user interaction with the processor in the device.

9. The method of claim 8, wherein receiving the request to access audio information detected by the microphone comprises associating the request with data derived from (i) an identifier for the processing module and (ii) data indicating a time.

10. A device, comprising:
a microphone;
a processor that handles primary functions of the device; and
a processing module configured to perform operations comprising:

restricting, by a processing module in a device, access by a processor in the device to audio information detected by a microphone in the device;
receiving, by the processing module in the device, data from the processor in the device indicating that the processor in the device is authorized during a limited period of time to access audio information detected by the microphone in the device;
in response to receiving data indicating that the processor in the device is authorized during the limited period of time to access audio information detected by the microphone in the device, providing the processor in the device access to audio information detected by the microphone in the device;
monitoring, by the processing module in the device, audio information detected by the microphone in the device during the limited period of time for the presence of a hotword; and
after the end of the limited period of time, restricting, by the processing module in the device, access by the processor in the device to audio information detected by the microphone in the device.

11. The device of claim 10, wherein the operations further comprise restricting access to audio information detected by the microphone in response to determining that the limited period of time has ended.

12. The device of claim 10, wherein receiving the data from the processor in the device indicating that the processor in the device is authorized during a limited period of time to access audio information detected by the microphone in the device comprises:
receiving a token from the processor indicating (i) that the processor in the device is authorized to access the audio information detected by the microphone during the limited period of time and (ii) a duration of the limited period of time;
wherein the method further comprises:
evaluating the token to verify validity of the token; and
in response to verifying the validity of the token, extracting data of the token indicating (i) that the processor in the device is authorized to access the audio information detected by the microphone during the limited period of time and (ii) a duration of the limited period of time.

13. The device of claim 10, wherein restricting access by the processor in the device to audio information detected by the microphone comprises at least one of:
encrypting the audio information detected by the microphone; or
blocking access of the audio information from the processing module to the processor in the device.

14. The device of claim 10, wherein the operations further comprise:
detecting the presence of the hotword during the limited period of time; and
in response to detecting the presence of the hotword during the limited period of time, restricting, during the limited period of time, access by the processor in the device to audio information that is detected by the microphone and that follows the hotword.

15. The device of claim 14, wherein the operations further comprise:
detecting, during the limited period of time, a voice request that follows the hotword, wherein the voice request is a spoken command or request;
determining that the voice request has ended before the end of the limited period of time; and in response to determining that the voice request has ended before the end of the limited period of time, providing, to the processor in the device, unencrypted audio information detected after the end of the voice request.

16. The device of claim 15, wherein the operations further comprise:
after determining that the voice request has ended before the end of the limited period of time, and after providing unencrypted audio information detected after the end of the voice request, detecting a second voice request that occurs during the limited period of time and that is not preceded by an additional hotword; and
in response to detecting the second voice request that occurs during the limited period of time and is not preceded by an additional hotword, providing encrypted audio corresponding to the second voice request to the processor in the device.

17. The device of claim 10, wherein the operations further comprise receiving a request to access audio information detected by the microphone, wherein the request is provided by the processor in the device in response to detecting user interaction with the processor in the device.

18. The device of claim 17, wherein receiving the request to access audio information detected by the microphone comprises associating the request with data derived from (i) an identifier for the processing module and (ii) data indicating a time.

19. One or more non-transitory computer-readable media storing software comprising instructions executable by one or more processors that, upon such execution, cause the one or more processors to perform operations comprising:
restricting, by a processing module in a device, access by a processor in the device to audio information detected by a microphone in the device;
receiving, by the processing module in the device, data from the processor in the device indicating that the processor in the device is authorized during a limited period of time to access audio information detected by the microphone in the device;
in response to receiving data indicating that the processor in the device is authorized during the limited period of time to access audio information detected by the microphone in the device, providing the processor in the device access to audio information detected by the microphone in the device;
monitoring, by the processing module in the device, audio information detected by the microphone in the device during the limited period of time for the presence of a hotword; and
after the end of the limited period of time, restricting, by the processing module in the device, access by the processor in the device to audio information detected by the microphone in the device.

20. The method of claim 1, wherein restricting, by a processing module in a device, access by a processor in the device to audio information detected by a microphone in the device comprises providing the processor in the device audio information detected by the microphone in the device in an encrypted form,
wherein in response to receiving data indicating that the processor in the device is authorized during the limited period of time to access audio information detected by the microphone in the device, providing the processor in the device access to audio information detected by the microphone in the device comprises in response to receiving data indicating that the processor in the device is authorized during the limited period of time to access audio information detected by the microphone in the device, providing the processor in the device access to audio information detected by the microphone in the device in an unencrypted form.

* * * * *